W. W. KARRO.
UNITARY MOTOR MOUNT.
APPLICATION FILED OCT. 3, 1919.
1,369,748.
Patented Feb. 22, 1921.
Fig. 1.
Fig. 2.
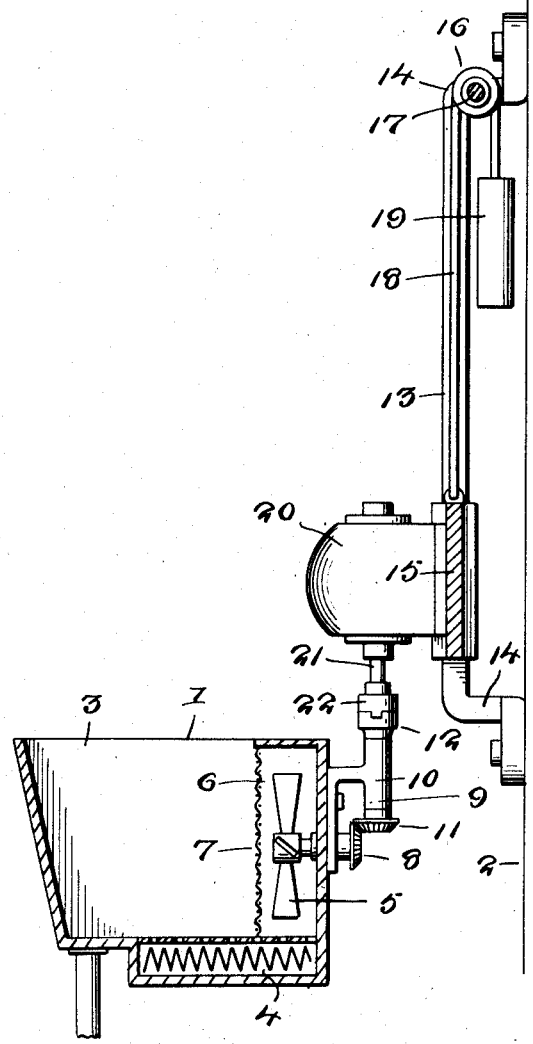
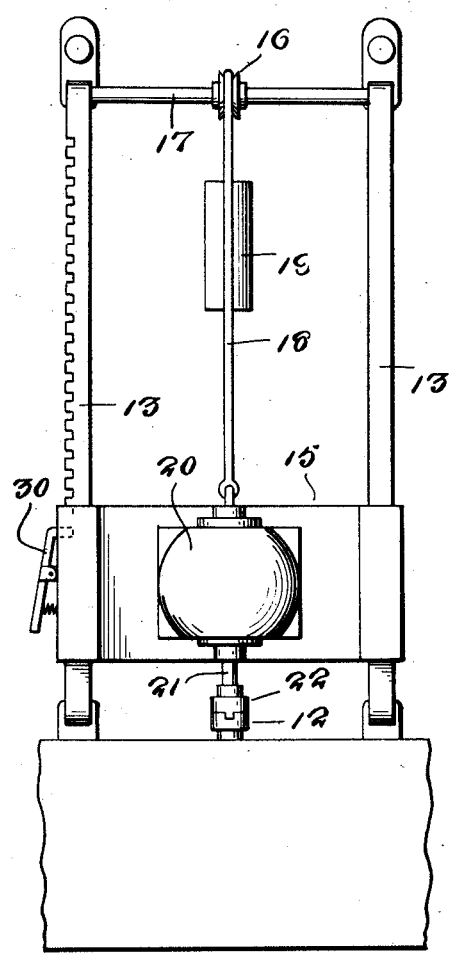
Inventor
W. W. Karro
Witnesses
E. Q. Ruppert
By Victor J. Evans
Attorney

UNITED STATES PATENT OFFICE.

WILLIAM W. KARRO, OF GREAT NECK, NEW YORK.

UNITARY MOTOR-MOUNT.

1,369,748.   Specification of Letters Patent.   Patented Feb. 22, 1921.

Application filed October 3, 1919. Serial No. 328,186.

*To all whom it may concern:*

Be it known that I, WILLIAM W. KARRO, a citizen of the United States, residing at Great Neck, in the county of Nassau and State of New York, have invented new and useful Improvements in Unitary Motor-Mounts, of which the following is a specification.

The object of my present sole invention is the provision of a simple and inexpensive motor mount adapted to be handled as one piece for convenient application and removal, and designed especially for use to advantage in a kitchen and in proper proximity to a sink; the motor being adapted to be raised and lowered and adjustably fixed with practically no effort on the part of the operator.

To the attainment of the foregoing, the invention consists in the improvement as hereinafter described and definitely claimed.

In the accompanying drawings, hereby made a part hereof:

Figure 1 is a view, partly in side elevation and partly in vertical section, illustrating the best practical embodiment of my invention of which I am cognizant.

Fig. 2 is an elevation of the motor and its mount, taken at right angles to Fig. 1.

Similar numerals of reference designate corresponding parts in both views of the drawings.

In Fig. 1 I illustrate my novel motor mount in the preferred arrangement relatively to a sink 1, and a kitchen wall 2, and in the sink I illustrate a dish-washer including a pan 3, a resistance coil 4 for heating purposes, a rotary agitator 5 disposed in a compartment 6 of the pan which is separated from the major portion thereof by a foraminous wall 7, and a driving connection for transmitting motion to the agitator 5; the said driving connection as shown being made up of a miter gear 8 on the shaft of the agitator, and a driving shaft 9 journaled in a bracket 10 and carrying a miter gear 11 and a coupling member 12.

My novel mount includes upright bars 13 arranged in parallel relation and provided at their ends with bracket arms 14 adapted for connection to the wall 2, a vertically movable carrier 15 having vertically-disposed end sleeves arranged on said bars 13, a sheave 16 mounted on a shaft 17 interposed between the upright arms 14, and a cable 18 passed over the sheave 16 and connected at one end to the carrier 15 and at its opposite end to the counter-balance weight 19. Suitably fixed to the carrier 15 and positioned in opposed relation to the face thereof is an electric motor 20 the armature shaft 21 of which is provided with a coupling member 22 designed for connection with the coupling member 12 of the dish-washing means, or with any other device that it is desired to rotate through the medium of the motor. Manifestly when desired, the armature shaft 21 may be equipped in lieu of a coupling member with a chuck or any other appliance known in the art, and adapted for the connection of a device to be rotated to the armature shaft.

At one side the carrier 15 is provided with a spring-pressed detent 30 which is adapted, by engaging depressions 31 in one of the bars 13, to adjustably fix the carrier 15 at the height desired.

In the practical use of my novel mount, the carrier 15 may, when the detent 30 is disengaged from the adjacent bar 13, be conveniently raised or lowered without substantial effort on the part of the operator. It will also be understood that the carrier may be expeditiously and easily moved downward when it is desired to connect the shaft 21 and a particular rotary device in the sink 1, and that after an operation of the said rotary device, the carrier and the motor may as readily be raised for the detachment of the rotary device alluded to, and the convenient positioning of another rotary device.

It will further be appreciated from the foregoing that my novel mount is susceptible of being readily connected to and removed from the wall 2 without the employment of skilled labor.

Having described my invention, what I claim and desire to secure by Letters-Patent, is:

A motor mount comprising parallel upright bars with bracket arms at their ends to maintain the bars in spaced relation to a wall or other support; one of the bars having spaced depressions in its outer edge, a sheave mounted on a shaft interposed between the upper bracket arms of the bars, a motor carrier having vertically disposed end sleeves slidable up and down on the bars, a counter-balance weight movable in the clearance between the wall and the carrier, a cable looped over the sheave and having pendent portions connected to the counter-balance weight and the carrier, and a spring-pressed lever detent mounted on the outer side of one end sleeve of the carrier and arranged to seat in said depressions of the upright bar.

In testimony whereof I affix my signature.

WILLIAM W. KARRO.